(12) United States Patent  (10) Patent No.: US 7,876,014 B2
Lee  (45) Date of Patent: Jan. 25, 2011

(54) PERMANENT MAGNET ROTOR WITH INCREASED MAGNETIC FLUX

(75) Inventor: Sun-Hyu Lee, Sunchon Chonnam (KR)

(73) Assignee: Sun Tech Generator Co., Ltd., Sunchon Chonnam (KR)

( * ) Notice: Subject to any disclaimer, the term of this patent is extended or adjusted under 35 U.S.C. 154(b) by 272 days.

(21) Appl. No.: 11/740,909

(22) Filed: Apr. 26, 2007

(65) Prior Publication Data

US 2007/0252468 A1    Nov. 1, 2007

(30) Foreign Application Priority Data

Apr. 27, 2006  (KR) .................... 10-2006-0038009
Jan. 29, 2007  (KR) .................... 10-2007-0008736

(51) Int. Cl.
H02K 11/00  (2006.01)
H02K 21/12  (2006.01)

(52) U.S. Cl. ................... 310/156.53; 310/156.56; 310/156.57; 310/181; 310/190; 310/191

(58) Field of Classification Search ............ 310/156.53, 310/156.55, 156.56, 156.57, 181, 190, 191, 310/209
See application file for complete search history.

(56) References Cited

U.S. PATENT DOCUMENTS

| | | | | |
|---|---|---|---|---|
| 3,670,189 | A * | 6/1972 | Monroe ..................... | 310/46 |
| 5,581,140 | A * | 12/1996 | Futami et al. ............. | 310/156.53 |
| 6,025,667 | A * | 2/2000 | Narita et al. ............. | 310/156.53 |
| 6,037,691 | A * | 3/2000 | Akemakou .................. | 310/191 |
| 6,271,613 | B1 * | 8/2001 | Akemakou et al. .......... | 310/181 |
| 6,472,789 | B1 * | 10/2002 | Akemakou ................ | 310/156.57 |
| 6,784,586 | B2 * | 8/2004 | Akemakou .................. | 310/194 |
| 6,847,143 | B1 * | 1/2005 | Akemakou ................. | 310/156.43 |
| 7,105,974 | B2 * | 9/2006 | Nashiki ..................... | 310/185 |
| 2005/0110364 | A1 * | 5/2005 | Yanagisawa ................ | 310/261 |
| 2005/0258699 | A1 * | 11/2005 | Hsu ......................... | 310/156.56 |
| 2006/0055267 | A1 * | 3/2006 | Arimitsu et al. ......... | 310/156.53 |
| 2006/0119206 | A1 * | 6/2006 | Akemakou ................... | 310/181 |
| 2007/0090713 | A1 * | 4/2007 | Arita et al. ............. | 310/181 |
| 2007/0096577 | A1 * | 5/2007 | Guven et al. .......... | 310/156.53 |
| 2007/0126304 | A1 * | 6/2007 | Ito et al. ............... | 310/156.53 |
| 2007/0247012 | A1 * | 10/2007 | Shin et al. ............. | 310/156.06 |

FOREIGN PATENT DOCUMENTS

| | | |
|---|---|---|
| KR | 20-1997-022692 | 8/1997 |
| KR | 10-1999-026592 | 7/1999 |
| KR | 10-1999-44900 | 10/1999 |

* cited by examiner

*Primary Examiner*—Karl I Tamai
*Assistant Examiner*—Terrance Kenerly
(74) *Attorney, Agent, or Firm*—IPLA P.A.; James E. Bame

(57) ABSTRACT

Disclosed is a rotor of a generator or motor having an auxiliary coil provided around a rotor body, thereby preventing the distortion of output voltage waveforms according to the variation of load, and thereby allowing the fine adjustment of the output voltages of the generator by the control of the current flowing to the auxiliary coil. The rotor of a generator or motor includes: a rotor body adapted to axially rotate together with a rotor shaft; at least one set of N-polar and S-polar permanent magnet groups arranged along the circumferential direction of the rotor body at predetermined intervals; and a plurality of magnetic flux-increasing elements formed on the lines of magnetic force formed by the N-polar and S-polar permanent magnet groups around one side of the rotor body.

8 Claims, 10 Drawing Sheets

FIG. 14

Marine Generator
 CELL 9 UNIT
 DELTA- CONNECTION
 POWER FACTOR 1.0
 PHASE 3  60HZ

| TEST RESULT | | | |
|---|---|---|---|
| NO LOAD | R−S | 221.7 V | 62.3HZ |
| | S−T | 220 V | |
| | R−T | 220.0V | |
| 25KW LOAD | R−S | 221.3 V | 61.9HZ |
| | S−T | 219.1V | |
| | R−T | 220V | |
| 50KW LOAD | R−S | 222V | 61.7HZ |
| | S−T | 219.3V | |
| | R−T | 219.7V | |
| 115KW LOAD | R−S | 222V | 61.5HZ |
| | S−T | 219V | |
| | R−T | 220 V | |
| 200KW LOAD | R−S | 221V | 61.3HZ |
| | S−T | 218.7V | |
| | R−T | 218.4 V | |

FIG. 15

Marine Generator
CELL 9 UNIT
DELTA- CONNECTION
POWER FACTOR 1.0
PHASE 3   60HZ

| TEST RESULT | | | |
|---|---|---|---|
| NO LOAD | R-S | 221.7 V | 62.5HZ |
| | S-T | 221 V | |
| | R-T | 220.0V | |
| 27KW LOAD | R-S | 221.3 V | 61.9HZ |
| | S-T | 219.1V | |
| | R-T | 218V | |
| 50KW LOAD | R-S | 219V | 61.5HZ |
| | S-T | 218.3V | |
| | R-T | 219.2V | |
| 110KW LOAD | R-S | 218V | 61.2HZ |
| | S-T | 217V | |
| | R-T | 218 V | |
| 200KW LOAD | R-S | 216V | 61.0HZ |
| | S-T | 216.1V | |
| | R-T | 215.2 V | |

PERMANENT MAGNET ROTOR WITH INCREASED MAGNETIC FLUX

CROSS REFERENCE

Applicant claims foreign priority under Paris Convention and 35 U.S.C. §119 to Korean Patent Application No. 10-2006-0038009, filed Apr. 27, 2006, and to Korean Patent Application No. 10-2007-0008736, filed Jan. 29, 2007 each with the Korean Intellectual Property Office.

BACKGROUND OF THE INVENTION

1. Field of the Invention

The present invention relates to a rotor of a generator or motor, and more particularly, to a magnetic rotor of a generator or motor.

Further, the present invention relates to a rotor of a generator having an auxiliary coil provided around a rotor body.

2. Background of the Related Art

Generally, a generator is a device that generates an electromotive force by electromagnetic induction to convert a mechanical energy into an electrical energy. Most of generators are rotators, and recently, linearly moving generators are developed.

The generator requires magnets producing a magnetic field and a conductor generating an electromotive force, and in this case, any one of the magnets and the conductor should be moved. A generator in which the conductor stops and the magnetic field rotates is a revolving field type, and contrarily, a generator in which the conductor rotates and the magnetic field stops is a revolving armature type.

Permanent magnets are used in a small-sized generator, but generally, an electromagnet, that is formed by winding coils around a core to apply direct current to the coils, is adopted for generators. In this case, if the current is increased or decreased, the strength of the electromagnet can also be increased or decreased, such that the magnitude of the electromotive force can be freely varied.

On the other hand, according to the prior art as disclosed in Korean Patent No. 373427 entitled 'magnetic motor and generator', a plurality of slits are radially formed around an iron core, and a plurality of magnets are detachably inserted into the corresponding slits, such that the magnetic flux in an air gap between a stator and a rotor can be increased or decreased.

In the prior art where the permanent magnets are inserted to the rotor, however, the lines of magnetic force caused by the permanent magnets may be formed differently from that upon the initial designing, in the rotor conducting a rotary movement at a high speed, thereby making it difficult to adjust the variables that give influence on the magnetic flux.

Since the magnetic flux and the lines of magnetic force are varied in the arrangement of the plurality of permanent magnets, further, the experiments or studies on the their arrangement should be executed continuously.

On the other hand, there occurs a problem that the rotor and stator of the generator are overheated by the electromagnetic induction.

In a case where a rotor shaft is formed of a conductive metal, furthermore, there occurs a problem that the electricity induced to the rotor is conductive to the rotor shaft.

On the other hand, the generator includes a cylindrical stator and a rotor having a rotary shaft in such a manner as to be rotatably inserted into the hollow of the stator. Further, the stator has coils wound to slots at the inside thereof and the rotor has permanent magnets coupled thereon. In some cases, of course, the stator has the permanent magnets coupled thereon and the rotor has the coils wound therearound.

The generator is a device that forcedly rotates the rotor to generate an electromotive force by the electromagnetic induction between the permanent magnets of the rotor and the coils of the stator and thus supplies the generated electromotive force as an output voltage to load.

In the generator supplying the output voltage to the load, there is a need for the continuous supply of a predetermined size of voltage to the load, which enhances a quality of electricity. In the conventional generators, however, the waveforms of the output voltage may be distorted by the generation of over shoot caused upon the initial load supply or upon the drastic variations of the load size, thereby making the quality of electricity deteriorated.

Additionally, the size of the output voltage of the generator is adjusted by the rotation speed of the rotor, but in the conventional generator it is difficult to control the rotation speed of the rotor in a precise manner, such that there is a problem that the fine adjustment of the output voltage is not accomplished. Since the size of the load is larger than one expected, moreover, only the magnetic force of the permanent magnets does not generate sufficiently the output voltage.

Also, the sectional areas of the permanent magnets around the outer periphery of the rotor body have a generally square shape. In a case of the rotor using the square-shaped permanent magnets, as shown in FIG. 12, the distribution of magnetic flux (the lines of magnetic force) is not uniform in the rotor body and the magnetic flux is lost in the rotor body, thereby reducing the generation efficiency of the generator.

The rotor includes a connection member having a bearing and a fixing bracket formed on one end of the rotor shaft, for coupling the rotor and the stator. As the rotor and the stator are coupled by means of the connection member, the magnetic flux of the rotor is leaked to the stator through the rotor shaft and the connection member, and thus, circulating magnetic flux flows between the rotor and the stator.

Such the generation of the leaking magnetic flux and circulating magnetic flux makes the generation efficiency of the generator deteriorated and further causes the bearing of the connection member to be early abraded. At this state, if the leaking and circulating magnetic flux is left as it is, the electrical loss may be caused undesirably.

SUMMARY OF THE INVENTION

Accordingly, the present invention has been made in view of the above-mentioned problems occurring in the prior art, and it is an object of the present invention to provide a rotor of a generator or motor that is capable of increasing magnetic flux to enhance the generation efficiency of the generator or motor, providing an air cooling function, and removing the danger of an electric shock caused by the rotor shaft.

It is another object of the present invention to provide a rotor of a generator that has an auxiliary coil provided around a rotor body to suppress the generation of over shoot of output voltage upon the initial load supply or upon the drastic load variations, thereby adjusting magnetic force upon drastic load variations to compensate the voltage drop or fluctuation, that has each of a plurality of permanent magnets rounded in their shape, thereby making the distribution of the magnetic flux in the rotor body formed uniformly and preventing the loss of the magnetic flux to enhance the generation efficiency of the generator, and that has a rotor shaft formed of an insulating material, thereby preventing the magnetic flux of the permanent magnets or the circulating magnetic flux between the rotor and the stator from being leaked or flowing through the rotor shaft to enhance the generation efficiency of the generator, thereby preventing the bearing from being early abraded, and thereby previously keeping electrical dangers from being caused.

To accomplish the above objects, according to an aspect of the present invention, there is provided a rotor of a generator or motor including: a rotor body adapted to axially rotate together with a rotor shaft; at least one set of N-polar and S-polar permanent magnet groups arranged along the circumferential direction of the rotor body at predetermined intervals; and a plurality of magnetic flux-accelerating magnets arranged on the lines of magnetic force formed by the N-polar and S-polar permanent magnet groups around one side of the rotor body.

Preferably, a middle magnet is disposed between each of the N-polar permanent magnet groups and each of the S-polar permanent magnet groups and has N and S poles arranged to form the lines of magnetic force in a radial direction of the rotor body.

Preferably, the rotor body has a cooling hole formed on at least any one space between each of the N-polar permanent magnet groups and the middle magnet and between each of the S-polar permanent magnet groups and the middle magnet.

Preferably, the N-polar permanent magnet groups of the permanent magnet groups are arranged in such a manner as to dispose the N-poles at the outer side along the radial direction of the rotor body, and the S-polar permanent magnet groups are arranged in such a manner as to dispose the S-poles at the outer side along the radial direction of the rotor body.

Preferably, the N-polar and S-polar permanent magnet groups of the permanent magnet groups are comprised of a plurality of magnets arranged along the circumferential direction of the rotor, and in this case, the magnets arranged in the middle portion in the groups have a magnetic force stronger than the magnets arranged at both sides thereof.

Preferably, the rotor body has division grooves formed along the outer circumference thereof to allow the N-polar permanent magnet groups to be spatially separated from the S-polar permanent magnet groups.

Preferably, the rotor body has a shaft-coupling part formed of an insulating material and adapted to be coupled around the outer periphery of the rotor shaft, the shaft-coupling part having a plurality of cooling holes formed thereon.

Preferably, the rotor shaft is made of stainless steel.

Preferably, the rotor body includes a plurality of unit rotor bodies laminated on top of one another along the shaft direction of the rotor shaft, and each of the unit rotor bodies has a plurality of rotary plates laminated on top of one another along the shaft direction of the rotor shaft.

Preferably, the middle magnet of each of the unit rotor bodies is formed along the circumferential direction of the rotary body in opposite direction to the middle magnet of adjacent rotary body thereto.

Preferably, the rotor further includes an assembling guide member formed thereon in such a manner as to pass through the plurality of unit rotor bodies.

To accomplish the above objects, according to another aspect of the present invention, there is provided a rotor of a generator including: a cylindrical rotor body having a shaft-inserting aperture formed at a central portion thereof for fittably inserting a rotor shaft thereto; a plurality of N-polar and S-polar permanent magnet groups arranged radially along the outer periphery of the rotor body in an alternating arrangement; and an auxiliary coil adapted to be wound at the inside of the rotor body for enclosing each of the plurality of N-polar and S-polar permanent magnet groups.

The auxiliary coil is connected to a power supply for supplying current thereto, thereby allowing the output voltage of the generator to be constantly maintained.

The N-polar and S-polar permanent magnet groups are rounded in such a manner as to make the virtual zero points thereof coincide with the zero point of the rotor body, and have a gradually small arc length toward the inside of the rotor body.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 14 is a table showing the output voltage data of the generator having the auxiliary coil; and FIG. 15 is a table showing the output voltage data of the generator having no auxiliary coil.

DETAILED DESCRIPTION OF THE PREFERRED EMBODIMENT

Hereinafter, an explanation of a rotor of a generator or motor according to the present invention will be given with reference to the attached drawings.

Figure 1:
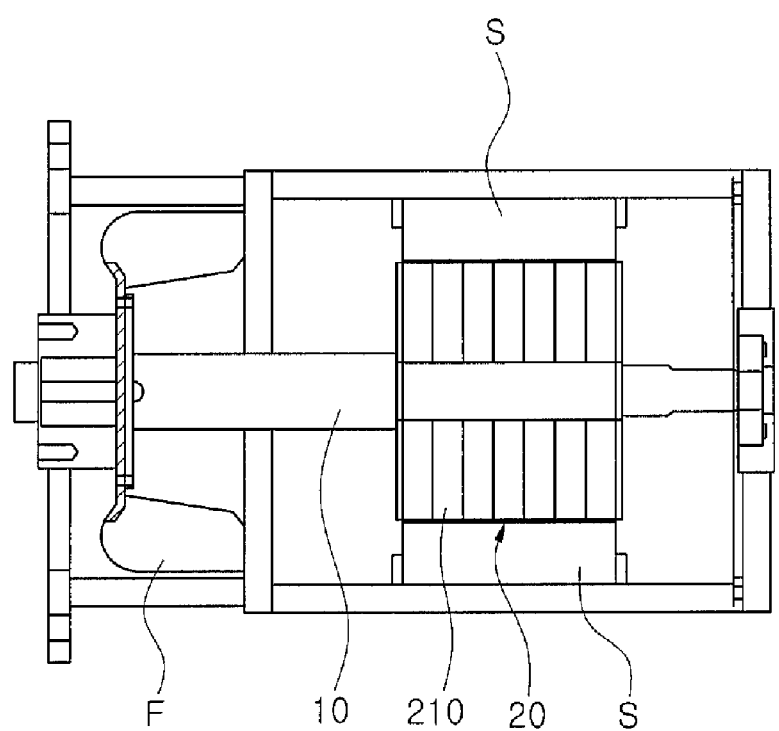
FIG. 1 is a schematic side sectional view showing a rotor of a generator or a motor according to an embodiment of the present invention.
Figure 2:
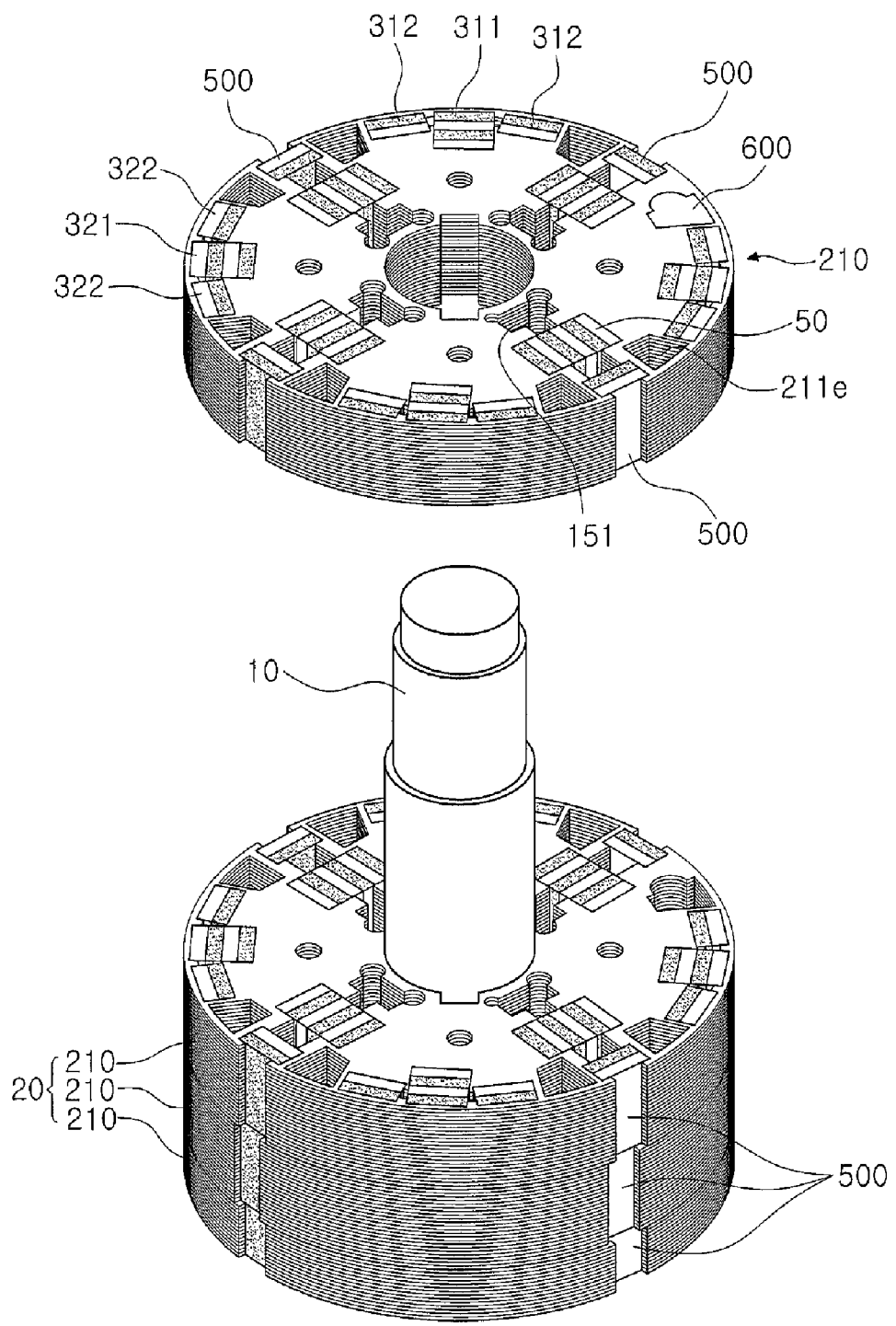
FIG. 2 is an exploded perspective view showing the rotor of this invention of FIG. 1.

FIG. 1 is a schematic side sectional view showing a rotor of a generator or a motor according to an embodiment of the present invention, and FIG. 2 is an exploded perspective view showing the rotor of this invention of FIG. 1.

Figure 3:
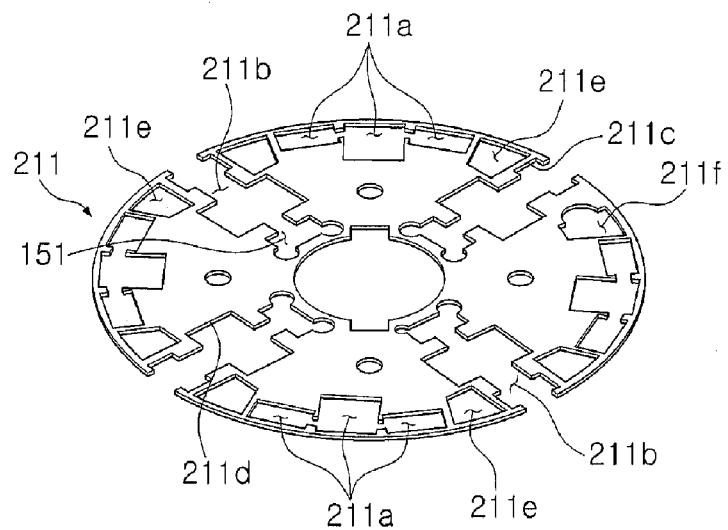
FIG. 3 is a perspective view showing the rotary plate of FIG. 2.
Figure 4:
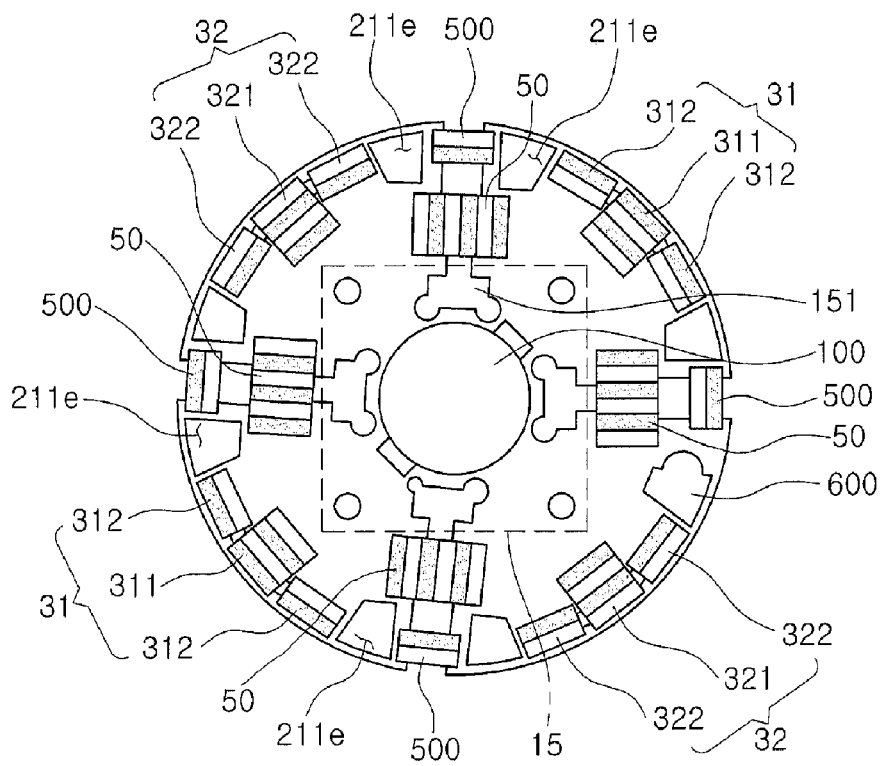
FIG. 4 is a plane view showing the rotor body of FIG. 2.
Figure 5:
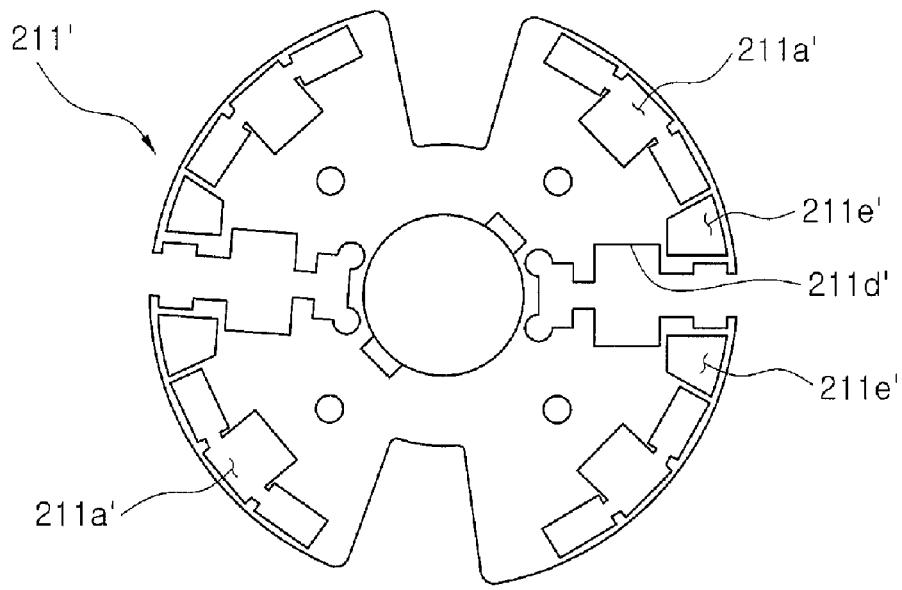
FIG. 5 is a plane view showing another example of the rotary plate of a rotor of a generator or motor according to the present invention.
Figure 6:
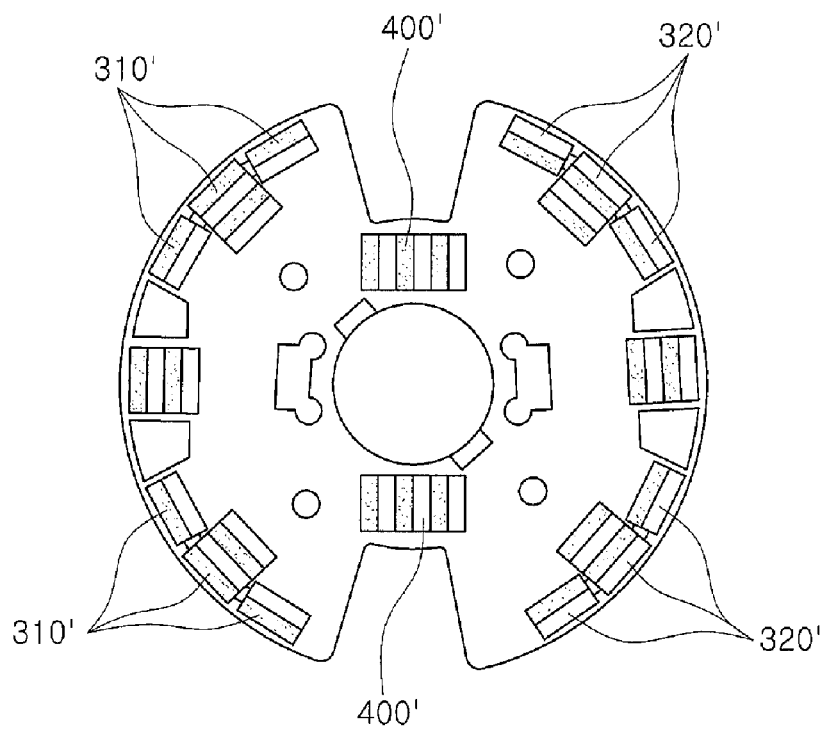
FIG. 6 is a plane view showing still another example of the rotary plate of a rotor of the generator or motor according to the present invention.

FIG. 3 is a perspective view showing the rotary plate of FIG. 2, FIG. 4 is a plane view showing the rotor body of FIG. 2, FIG. 5 is a plane view showing another example of the rotary plate of a rotor of a generator or motor according to the present invention, and FIG. 6 is a plane view showing still another example of the rotary plate of a rotor of the generator or motor according to the present invention.

Figure 7:
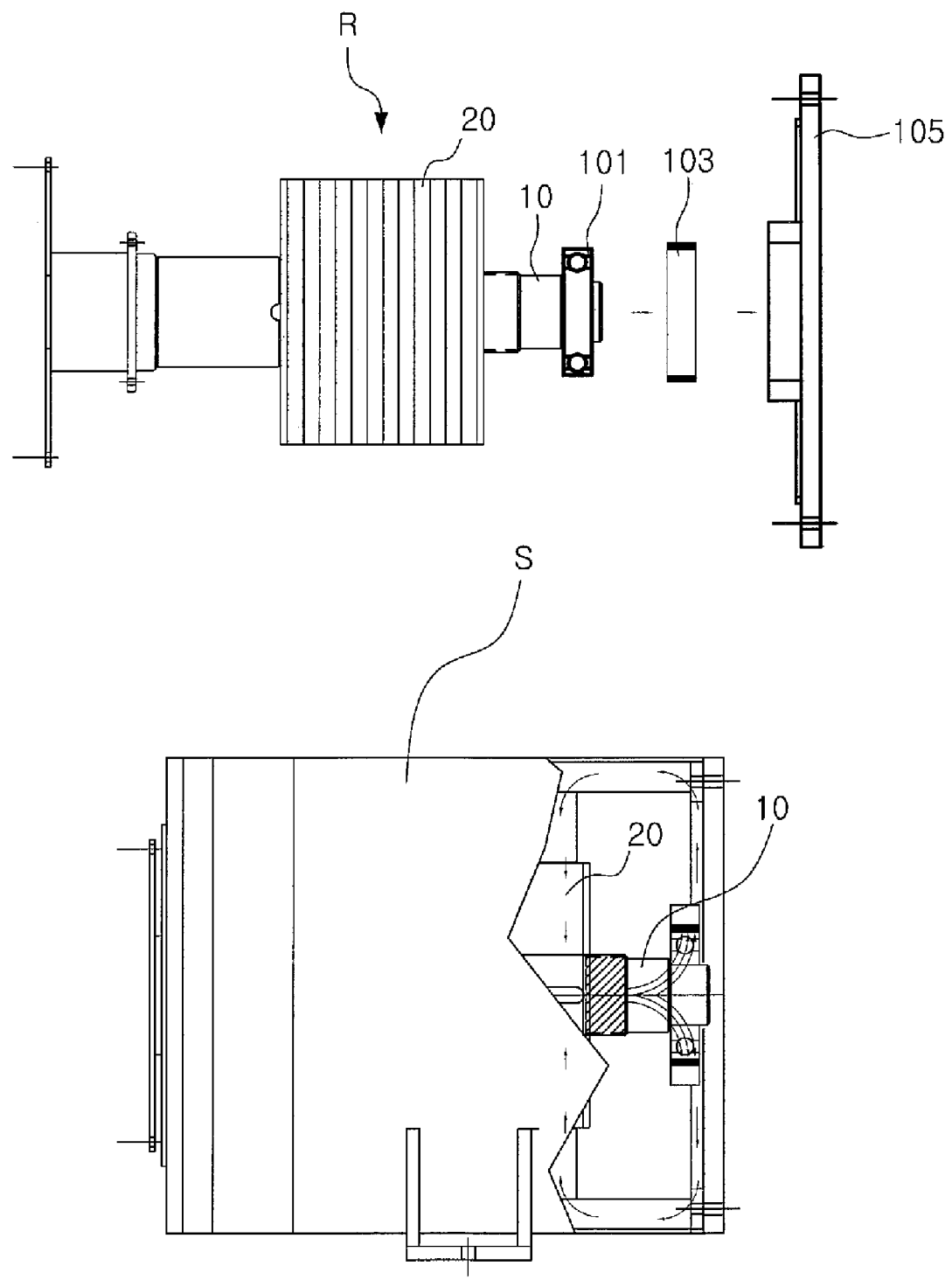
FIG. 7 is a partly cut sectional view and exploded sectional view of the generator and the connection member according to the present invention.
Figure 8:
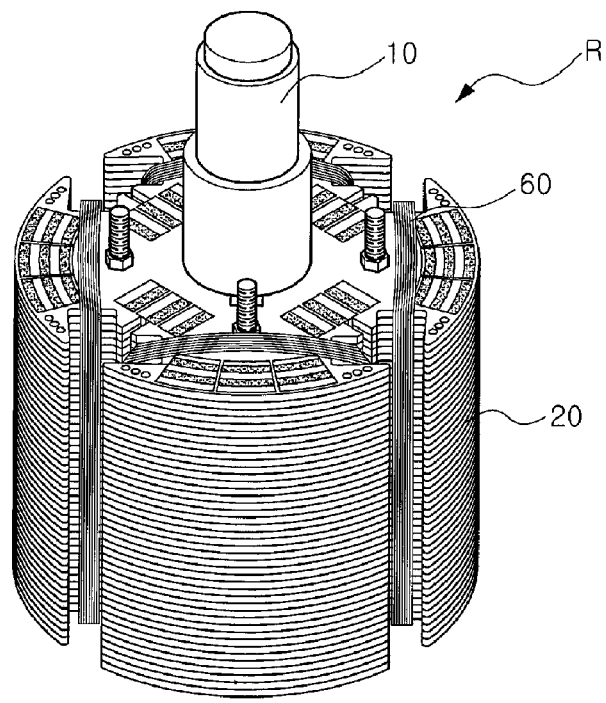
FIG. 8 is a perspective view showing the rotor of a generator according to another embodiment of the present invention.
Figure 9:
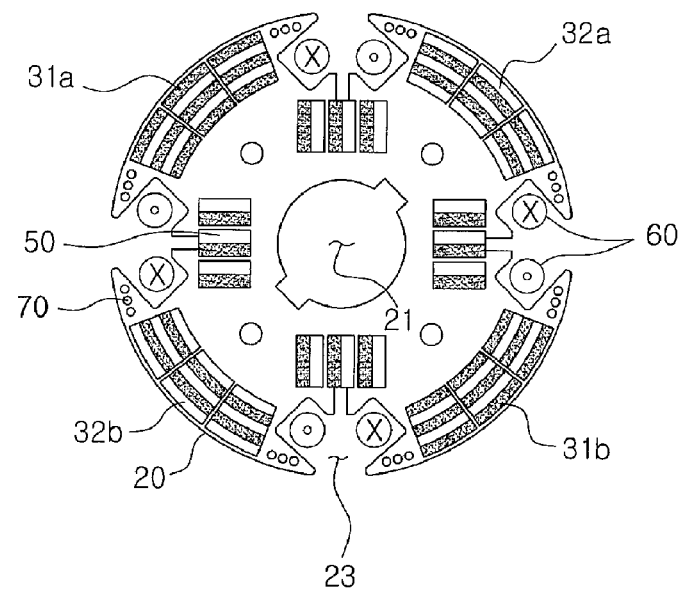
FIG. 9 is a plane view showing the rotor of the generator of FIG. 8.
Figure 10:
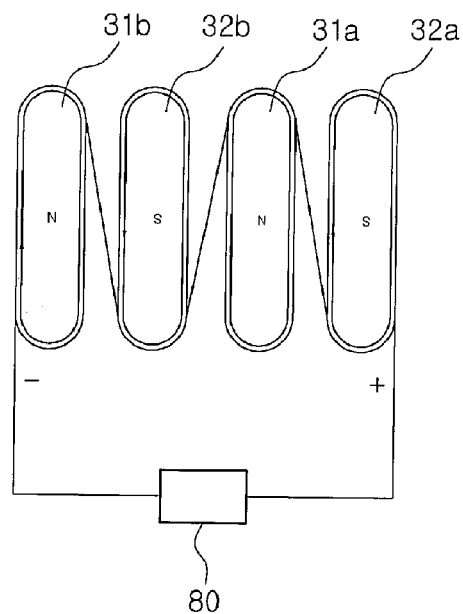
FIG. 10 is a circuit diagram showing the auxiliary coil employed according to the present invention.
Figure 11A:
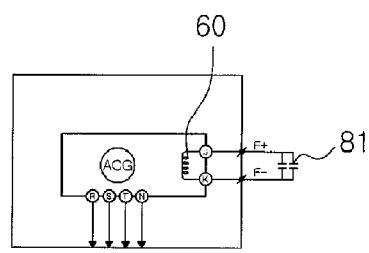
FIG. 11a is a circuit diagram showing the power supply as a condenser connected to the auxiliary coil.
Figure 11B:
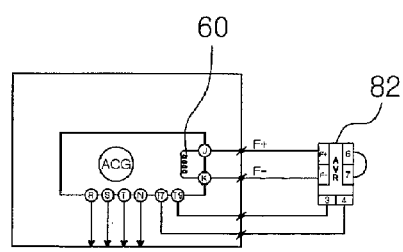
FIG. 11b is a circuit diagram showing the power supply as an auto voltage regulator (AVR) connected to the auxiliary coil.
Figure 12:
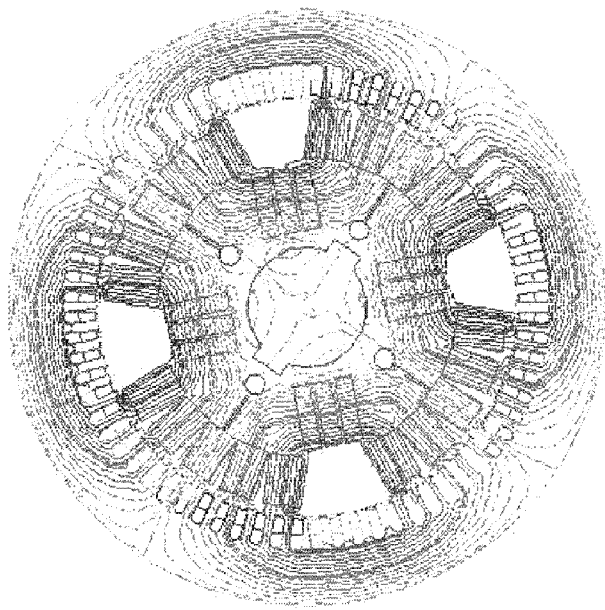
FIG. 12 is a view showing the lines of magnetic force according to a conventional rotor.
Figure 13:
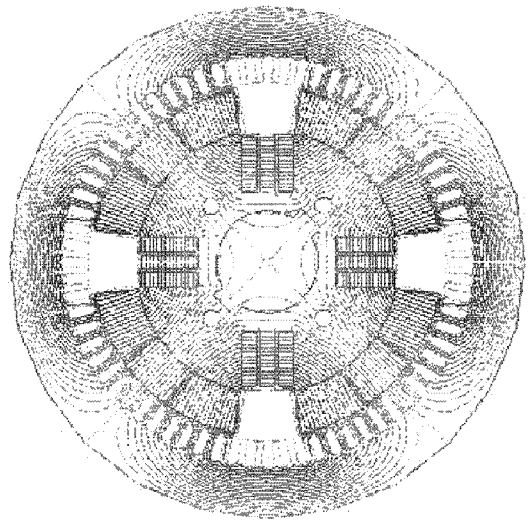
FIG. 13 is a view showing the lines of magnetic force according to the rotor of the present invention.

FIG. 7 is a partly cut sectional view and exploded sectional view of the generator and the connection member according to the present invention, FIG. 8 is a perspective view showing the rotor of a generator according to another embodiment of the present invention, and FIG. 9 is a plane view showing the rotor of the generator of FIG. 8, FIG. 10 is a circuit diagram showing the auxiliary coil employed according to the present invention, FIG. 11a is a circuit diagram showing the power supply as a condenser connected to the auxiliary coil, FIG. 11b is a circuit diagram showing the power supply as an auto voltage regulator (AVR) connected to the auxiliary coil, FIG. 12 is a view showing the lines of magnetic force according to a conventional rotor, FIG. 13 is a view showing the lines of magnetic force according to the rotor of the present invention, FIG. 14 is a table showing the output voltage data of the generator having the auxiliary coil, and FIG. 15 is a table showing the output voltage data of the generator having no auxiliary coil.

According to the preferred embodiment of the present invention as shown in FIG. 1, a stator S has a hollow portion adapted to receive a rotor body 20 therein and a plurality of slots formed around the wall surface forming the hollow portion, the plurality of slots having coils wound therearound. The rotor body 20 is provided with a rotor shaft 10 at the central portion thereof, and the rotor shaft 10 is coupled to a cooling fan F at its end portion thereof. The rotor body 20 is adapted to axially rotate together with the rotor shaft 10, and a plurality of N-polar and S-polar permanent magnet groups are arranged at predetermined intervals along the circumferential direction of the rotor body 20.

Referring to FIGS. 2 to 4, there is provided a rotor of a generator or motor according to the present invention including: the rotor body 20 adapted to axially rotate together with the rotor shaft 10; at least one set of N-polar and S-polar permanent magnet groups 31 and 32 arranged along the circumferential direction of the rotor body 20 at predetermined intervals; a plurality of magnetic flux-accelerating magnets 50 formed on the lines of magnetic force formed by the N-polar and S-polar permanent magnet groups 31 and 32 around one side of the rotor body 20; and a middle magnet 500 disposed between each of the N-polar permanent magnet groups 31 and each of the S-polar permanent magnet groups 32.

The rotor shaft 10 is an insulating material made of stainless steel. Therefore, the conduction between the rotor shaft 10 and the rotor body 20 is not formed.

The rotor shaft 10 is coupled around the outer periphery thereof to a shaft-coupling part 15 formed of an insulating material, such that the conduction between the rotor shaft 10 and the rotor body 20 can be also prevented.

The shaft-coupling part 15 has a plurality of shaft-cooling holes 151 formed thereon. Thus, the cooling area can be enlarged by the inner walls of the shaft-cooling holes 151, and as air flows to/from the shaft-cooling holes 151, the rotor body 20 can be cooled.

As shown in FIG. 2, the rotor body 20 includes a plurality of unit rotor bodies 210 laminated on top of one another along the shaft direction of the rotor shaft 10, and each of the unit rotor bodies 210 has a plurality of rotary plates 211 laminated on top of one another along the shaft direction of the rotor shaft 10.

The plurality of unit rotor bodies 210 are easily assembled, as shown in FIG. 2, by insertedly passing an assembling guide member 600 therethrough. That is, the assembling guide member 600 has an asymmetrical outer shape, and the rotary body 210 has a guide hole 211f formed on one side thereof to have the same shape as the assembling guide member 600. Therefore, when the unit rotor bodies 210 are assembled by inserting the guide holes 211f around the outer wall of the assembling guide member 600, the relative assembling positions of the unit rotor bodies 210 can be arranged well.

On the other hand, the plurality of unit rotor bodies 210 have the same shape as one another. As shown in FIG. 2, however, the middle magnet 500 of each of the unit rotor bodies 210 is formed along the circumferential direction of the rotary body 210 in opposite direction to that of adjacent rotary body thereto.

That is, one rotary body 210 is laminated in a zigzag arrangement on the adjacent rotary body 210 thereto. This allows initial shaft rotation of the rotor body 20 to be easily carried out.

The plurality of permanent magnet groups are inserted passed through the plurality of rotary plates 211 constituting each unit rotor body 210. Each of the plurality of rotary plates 211 has a plurality of magnet-receiving holes 211a formed thereon.

As shown in FIG. 4, the two sets of N-polar and S-polar permanent magnet groups 31 and 32 are provided at predetermined intervals along the circumferential direction of the rotary plate 211. Namely, the two N-polar permanent magnet groups 31 and the two S-polar permanent magnet groups 32 are coupled along the outer periphery of the rotary plate 211 in the circumferential direction of the rotary plate 211 in an alternating arrangement at predetermined intervals.

Therefore, the lines of magnetic force are formed from one N-polar permanent magnet group 31 toward the two adjacent S-polar permanent magnet groups 32. As a result, according to the present invention wherein the two N-polar permanent magnet groups 31 are provided, four lines of magnetic force are formed therefrom.

As shown in FIG. 3, each of the rotary plates 211 has four magnet-receiving holes 211a formed around one side thereof, for inserting the two N-polar permanent magnet groups 31 and the two S-polar permanent magnet groups 32 thereinto.

As shown in FIG. 4, the plurality of N-polar and S-polar permanent magnet groups 31 and 32 are comprised of a plurality of magnets arranged along the circumferential direction of the rotary plate 211, and in this case, the magnets 311 arranged in the middle portion in the groups have the magnetic force stronger than the magnets 312 arranged at both sides thereof. In other words, the number of the magnets 311 arranged in the middle portion in the groups is larger than the number of the magnets 312 arranged in the both sides thereof.

The magnets 311 and 312 constituting the N-polar permanent magnet group 31 are arranged in such a manner as to dispose the N-poles at the outer side along the radial direction of the rotor body 20, and the S-polar permanent magnet groups 32 are arranged in such a manner as to dispose the S-poles at the outer side along the radial direction of the rotor body 20.

In this case, the lines of magnetic force generated from the N-polar permanent magnet groups 31 enter the S-polar permanent magnet groups 32. Each of the rotary plates 211 has division grooves 211b formed along the outer circumference thereof to allow each of the N-polar permanent magnet groups 31 to be spatially separated from each of the S-polar permanent magnet groups 32. The formation of the division groove 211b enables the N-polar permanent magnet groups 31 to be completely spaced apart from the S-polar permanent magnet groups 32, such that the lines of magnetic force that are generated from the N-polar permanent magnet groups 31 and enter the S-polar permanent magnet groups 32 are formed clearly divided from one another.

A middle magnet 500 of each of the unit rotor bodies 210 is disposed at predetermined intervals between the N-polar permanent magnet group 31 and the S-polar permanent magnet group 32. The rotary plate 211 has a first magnet-coupling portion 211c formed along one side thereof, the first magnet-coupling portion 211c being coupled to the middle magnet 500.

As shown in FIG. 4, the middle magnets 500 have the N-poles and S-poles arranged to form the lines of magnetic force in a radial direction of the rotor body 20. In other words, like the N-polar and S-polar permanent magnet groups 31 and 32, the N-poles and S-poles of the middle magnets 500 are arranged in the radial direction of the rotor body 20.

Further, the middle magnet 500 has the same polarity as the permanent magnet group positioned after the middle magnet 500 along the rotary direction of the rotor body 20. For example, if the N-polar permanent magnet group 31, the middle magnet 500, and the S-polar permanent magnet group 32 are arranged sequentially along the rotary direction of the rotor body 20, the middle magnet 500 has the same polarity as the S-polar permanent magnet group 32. Therefore, since the S-polar permanent magnet group 32 has the S-pole formed nearer outside than the N-pole, the middle magnet 500 also has the S-pole formed nearer outside than the N-pole.

In this case, the lines of magnetic force generated from the N-polar permanent magnet group 31 enter the middle magnet 500. The lines of magnetic force that are generated from the N-polar permanent magnet group 31 and enter the S-polar permanent magnet group 32 form a relatively large oval shape, and contrarily, the lines of magnetic force that are generated from the N-polar permanent magnet group 31 and enter the middle magnet 500 form a relatively smaller oval shape than those generated from the N-polar permanent magnet group 31 and entering the S-polar permanent magnet group 32.

As shown in FIG. 3, the rotary body 210 has cooling holes 211e formed between the N-polar permanent magnet group 31 and the middle magnet 500 and between the S-polar permanent magnet group 32 and the middle magnet 500.

Each of the magnetic flux-increasing elements 50 is disposed on the lines of magnetic force formed from the pair of the N-polar permanent magnet group 31 and the S-polar permanent magnet group 32, thereby functioning to increase the magnetic flux. In other words, each of the magnetic flux-increasing elements 50 is disposed on the division groove 211b of the rotor 20. The rotary plate 211 has a second magnet-coupling portion 211d formed at one side thereof for receiving the magnetic flux-increasing element 50 thereinto. In the preferred embodiment of the present invention, the first magnet-coupling portion 211c and the second magnet-coupling portion 211d communicate with the division groove 211b.

Each of the plurality of magnetic flux-increasing elements 50 is formed of a plurality of magnets having the N and S poles wherein the S-poles face the S-polar permanent magnet group 32 and the N-poles face the N-polar permanent magnet group 31. This is because the N-poles of the S-polar permanent magnet group 32 and the S-poles of the N-polar permanent magnet group 31 are placed at the inside of the center portion of the rotor 20.

Therefore, the lines of magnetic force generated from the N-polar permanent magnet group 31 enter the middle magnets 500, and the lines of magnetic force generated from the S-polar permanent magnet group 32 enter the magnetic flux-increasing elements 50. The magnetic force entered the magnetic flux-increasing elements 50 enters the N-polar permanent magnet group 31 again, thereby forming the lines of magnetic force of a generally oval shape. Like this, the magnetic flux-increasing elements 50 are disposed on the lines of magnetic force passing through the inside of the rotor 20, thereby enabling the lines of magnetic force to be clearly formed at the inside of the rotor 20 as well as enabling the magnetic flux to be accelerated.

Table 1 shows test results of the performances of the generator using the rotor according to the preferred embodiment of the present invention.

TABLE 1

| TEST RESULTS | | | |
|---|---|---|---|
| NO LOAD | R-S | 221.7 V | 52.4 HZ |
|  | S-T | 220 V |  |
|  | R-T | 220.8 V |  |
| 6 KW LOAD | R-S | 221.3 V | 51.93 HZ |
|  | S-T | 219.1 V |  |
|  | R-T | 220 V |  |
| 10 KW LOAD | R-S | 222 V | 51.86 HZ |
|  | S-T | 219.5 V |  |
|  | R-T | 219.9 V |  |
| 15 KW LOAD | R-S | 222 V | 51.42 HZ |
|  | S-T | 219 V |  |
|  | R-T | 220 V |  |
| 20 KW LOAD | R-S | 221 V | 51.33 HZ |
|  | S-T | 219.3 V |  |
|  | R-T | 219.3 V |  |

In Table 1, the generator is a three-phase alternating current/delta-connection system. The stator S has a frequency of 50 HZ, the rotor has a length of 216 mm, the stator S has a length of 210 mm and a diameter of 220 mm, and the air gap has a length of 218.3 mm.

It can be appreciated from Table 1 that the engine frequency in the case of the load of 20 KW drops by about 1 HZ, when compared with the case of no load.

TABLE 2

| TEST RESULTS | | | |
|---|---|---|---|
| NO LOAD | R-S | 381.8 V | 52.4 HZ |
|  | S-T | 381.6 V |  |
|  | R-T | 381 V |  |
| 13 KW LOAD | R-S | 379 V | 51.27 HZ |
|  | S-T | 378.7 V |  |
|  | R-T | 378.8 V |  |
| 19 KW LOAD | R-S | 377.8 V | 51.19 HZ |
|  | S-T | 376.8 V |  |
|  | R-T | 376.5 V |  |

In Table 2, the generator is a three-phase alternating current/star-connection system. The stator S has a frequency of 50 HZ, the rotor has a length of 216 mm, the stator S has a length of 210 mm and a diameter of 220 mm, and the air gap has a length of 218.3 mm.

It can be appreciated from Table 2 that the engine frequency in the case of the load of 19 KW drops by about 1.2 HZ, when compared with the case of no load.

FIG. 5 is a plane view showing another example of the rotary plate of a rotor of a generator or motor according to the present invention, and FIG. 6 is a plane view showing still another example of the rotary plate of a rotor of the generator or motor according to the present invention.

As shown in FIGS. 5 and 6, the rotor of the present invention has two N-polar permanent magnet groups 31' and two S-polar permanent magnet groups 32' arranged continuously at predetermined intervals along the outer periphery of the rotary plate 211'. That is, the two N-polar permanent magnet groups 31' are formed adjacent to each other, and the two S-polar permanent magnet groups 32' are formed adjacent to each other.

Therefore, the line of magnetic force is formed generated from one N-polar permanent magnet group 31' and entering one S-polar permanent magnet group 32'. In the preferred embodiment of the present invention where the two N-polar permanent magnet groups 31' are provided, two lines of magnetic force are formed. One magnetic flux-increasing element 50 is provided to one N-polar permanent magnet group 31' and one S-polar permanent magnet group 32' forming one line of magnetic force.

FIG. 7 is a partly cut sectional view and exploded sectional view of the generator and the connection member according to the present invention.

As shown in FIG. 7, the generator includes the stator S, the rotor body 20 disposed at the hollow portion inside the stator S, and the rotor shaft 10 shaft-coupled to the rotor body 20.

A connection member 100 has a bearing 101 coupled at one end of the rotor shaft 10, a fixing bracket 105 coupled to the bearing 101 in such a manner as to surround the outer periphery of the bearing 101 and fixedly coupled to the stator S, and an insulation sleeve 103 formed of a nonmagnetic material and disposed between the bearing 101 and the fixing bracket 105 for preventing the magnetic flux of the rotor body 20 from leaking to the stator S through the rotor shaft 10.

The insulation sleeve 103 is made of stainless steel, a nonmagnetic material, or an insulating material, and is disposed between the bearing 101 and the fixing bracket 105.

The insulation sleeve 103 cuts off the leaking current and circulating magnetic flux flowing between the stator S and the rotor body 20, while preventing the magnetic flux of the rotor body 20 from leaking to the stator S through the rotor shaft 10.

FIG. 8 is a perspective view showing the rotor of the generator according to another embodiment of the present invention, and FIG. 9 is a plane view showing the rotor of the generator of FIG. 8.

As shown in FIG. 8, the rotor of this invention includes a rotor shaft 10, a cylindrical rotor body 20, and an auxiliary coil 60.

As a plurality of round rotary plates are laminated along the shaft direction of the rotor shaft 10, the rotor body 20 is of a cylindrical shape. The rotor body 20 is housed in the hollow of the stator of the generator and rotated together with the rotor shaft 10.

As shown in FIG. 9, each of the rotary plates is made of a magnetic material and has a shaft-coupling hole 21 fitted around the rotor shaft 10. Further, the rotor shaft 10 is formed of stainless steel as a nonmagnetic material, which prevents the magnetization of the permanent magnets and the loss of magnetic flux.

The rotor body 20 has a plurality of permanent magnets arranged radially along the outer periphery thereof, for conducting electromagnetic induction together with the coils of the stator.

That is, two N-polar permanent magnet groups 31a and 31b are insertedly coupled to the rotor body 20 in such a manner as to dispose the N-poles along the outside of the rotor body 20, and two S-polar permanent magnet groups 32a and 32b are insertedly coupled to the rotor body 20 in such a manner as to dispose the S-poles along the outside of the rotor body 20. In this case, the two N-polar permanent magnet groups 31a and 31b and the two S-polar permanent magnet groups 32a and 32b are radially arranged in turn along the circumferential direction of the rotor body 20 at the outside of the rotor body 20.

Each of the N-polar and S-polar permanent magnet groups 31a, 31b, 32a, and 32b includes a plurality of permanent magnets. In other words, as shown in FIG. 8, the permanent magnets are arranged in three rows, spaced apart by a predetermined distance along the circumferential direction of the rotor body 20, and the permanent magnets on each row are laminated on top of one another, spaced apart by a predetermined distance in the radial direction of the rotor body 20.

In this case, the formation of the plurality of permanent magnets in the N-polar permanent magnet groups 31a and 31b and the S-polar permanent magnet groups 32a and 32b enables the generation efficiency of the generator to be better than the formation of a single permanent magnet therein. On the other hand, the formation of the distances between the permanent magnet groups enables the air gap between the permanent magnets to be maintained, thereby preventing the permanent magnet from being escaped from the rotor body 20 during the high speed rotation of the rotor body 20.

Further, the rotor includes magnetic flux-increasing elements 50 insertedly coupled to the rotor body 20 and disposed on the lines of magnetic force formed by the N-polar permanent magnet groups 31a and 31b and the S-polar permanent magnet groups 32a and 32b, so as to increase the magnetic flux.

Each of the magnetic flux-increasing elements 50 includes a plurality of permanent magnets arranged spaced apart by a predetermined distance from one another. In this case, the N-poles face the inside S-poles of the N-polar permanent magnet groups 31a and 31b, and the S-poles face the inside N-poles of the S-polar permanent magnet group 32a and 32b.

The magnetic flux-increasing elements 50 serve to make the lines of magnetic force clearly formed inside the rotor body 20 by the N-polar permanent magnet groups 31a and 31b and the S-polar permanent magnet group 32a and 32b and also serve to increase the magnetic flux, thereby enhancing the generation efficiency of the generator.

The rotor body 20 has a division groove 23 formed along the outer circumference thereof to allow each of the N-polar permanent magnet groups 31a and 31b to be spatially separated from each of the S-polar permanent magnet groups 32a and 32b. The formation of the division groove 23 enables the lines of magnetic force generated from the N-polar permanent magnet groups 31a and 31b and entering the S-polar permanent magnet groups 32a and 32b to be clearly formed divided from one another.

Further, a plurality of copper rods 70 are insertedly coupled between each of the N-polar permanent magnet groups 31a and 31b and each of the S-polar permanent magnet group 32a and 32b along the outside of the rotor body 20. As each of the copper rods 70 is formed of a nonmagnetic material, it can reduce Hysteresis loss to make the frequency waveforms smooth.

The N-polar and S-polar permanent magnet groups 31a, 31b, 32a, and 32b are rounded in such a manner as to make the virtual zero points thereof coincide with the zero point of the rotor body 20 and have a gradually small arc length toward the inside of the rotor body 20.

The shape and arrangement of the N-polar and S-polar permanent magnet groups 31a, 31b, 32a, and 32b allows the distribution of the magnetic flux in the rotor body to be formed uniformly and prevents the loss of the magnetic flux.

According to the present invention, the rotor body 20 is provided with the auxiliary coil 60. As shown in FIG. 9, the auxiliary coil 60 is wound around the division grooves 23 in such a manner as to enclose each of the N-polar and S-polar permanent magnet groups 31a, 31b, 32a, and 32b. The method for winding the auxiliary coil 60 is illustrated in FIG. 10.

The auxiliary coil 60 serves to prevent the generation of over shoot caused upon the initial load supply or upon the drastic variations of the load size, serves to conduct the fine adjustment of the output voltage, and serves to compensate the lacking magnetic flux of the permanent magnets upon the connection to large load.

If the rotor is rotated to generate the electromagnetic induction between the coils of the stator and the permanent magnets of the rotor body, the minute current flows to the auxiliary coil 60 under the influence of the electromagnetic induction, thereby preventing the generation of over shoot and compensating the lacking magnetic flux of the permanent magnets. However, such the effects are weak. Thus, so as to positively conduct the functions of the auxiliary coil 60, the auxiliary coil 60 is connected to a power supply 80.

FIG. 11a is a circuit diagram showing the power supply as a condenser connected to the auxiliary coil, and FIG. 11b is a circuit diagram showing the power supply as an auto voltage regulator (AVR) connected to the auxiliary coil.

As shown in FIG. 11a, the power supply 80 is a condenser 81 that discharges the charged voltage therein when the output voltage of the generator drops and supplies the current to the auxiliary coil 60.

As shown in FIG. 11b, the power supply 80 is an AVR 82 that senses the output voltage of the generator and supplies current according to the sensed voltage size to the auxiliary coil 60.

FIG. 12 is a view showing the lines of magnetic force according to a conventional rotor, and FIG. 13 is a view showing the lines of magnetic force according to the rotor of the present invention.

FIG. 12 shows the lines of magnetic force of the conventional rotor wherein the N-polar permanent magnet groups 31a and 31b and the S-polar permanent magnet groups 32a and 32b have a rectangular shape, such that it is found that the lines of magnetic force formed by the N-polar permanent magnet groups 31a and 31b and the S-polar permanent magnet groups 32a and 32b are not smooth, which causes lots of bending and fails to obtain uniform distribution inside the rotor body 20.

On the other hand, FIG. 13 shows the lines of magnetic force of the rotor of this invention wherein the N-polar permanent magnet groups 31a and 31b and the S-polar permanent magnet groups 32a and 32b are rounded, such that it is found that the lines of magnetic force formed by the N-polar permanent magnet groups 31a and 31b and the S-polar permanent magnet groups 32a and 32b are smooth, which causes little bending and obtains uniform distribution inside the rotor body 20.

Like this, the degree of bending and the uniform distribution of the lines of magnetic force determine the degree of the efficiency of the generator, and also give an influence to the vibration and noise during the operation of the generator. That is, according to the present invention, the generation efficiency of the generator becomes improved and the generation of vibration and noise during the operation of the generator becomes reduced.

Now, an explanation on the functions of the auxiliary coil 60 will be in detail given.

According to the conventional practice, the output voltage of the generator is adjusted just by the rotation speed of the rotor. By the way, it is difficult to precisely control the rotation speed of the rotor only with the recent technology.

So as to adjust the output voltage of the generator to a desired voltage size, therefore, additional means, that is, the auxiliary coil 60 is needed.

In other words, the direct current is supplied to the auxiliary coil 60, and as the supplied current size is adjusted, the output voltage of the generator is adjusted. If the direct current is supplied to the auxiliary coil 60, the auxiliary coil 60 serves as an electro-magnet to conduct the electromagnetic induction together with the coils of the stator, and in this case, the current size flowing to the auxiliary coil 60 is finely adjusted, thereby enabling the output voltage of the generator to be finely adjusted.

FIG. 14 is a table showing the output voltage data of the generator having the auxiliary coil, and FIG. 15 is a table showing the output voltage data of the generator having no auxiliary coil.

As shown in FIG. 14, the rotor of this invention has three-phase and delta connection system and a frequency of 60 HZ. In a case where the auxiliary coil 60 is provided, the output voltages of the three phases (R, S, and T phases) are maintained near 220 V, irrespective of the load sizes of the generator.

As shown in FIG. 15, However, in a case where the auxiliary coil 60 is not provided, the output voltages of the three phases (R, S, and T phases) are less than 220 V, as the load size of the generator is increased.

In a case where the generator is connected to large load and does not resist the large load only with the magnetic force of the permanent magnets of the rotor, further, the current is supplied to the auxiliary coil 60 to compensate the lacking magnetic force of the permanent magnets.

Furthermore, the generation of over shoot is caused upon the initial load supply or upon the drastic variations of the load size. That is, the output voltage instantly does not have a stable given size upon the initial load supply or upon the drastic variations of the load size, thereby causing under shoot wherein the output voltages are repeatedly dropped and boosted (that is, the waveforms of the output voltages are distorted). Then, after a given period of time elapses, the output voltage can have a stable given voltage size.

The generation of over shoot makes the quality of electricity deteriorated, and therefore, there is a need for the reduction of the size of the under shoot and the time required to make the output voltage stable. This can be achieved by the auxiliary coil 60 of the present invention.

That is, the output voltage is sensed, and if it is boosted or dropped to a given size upon the generation of the over shoot, current is supplied to the auxiliary coil 60, such that the output voltage is not boosted and dropped anymore. Therefore, the output voltage can reach the stable given voltage size more rapidly.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

As set forth in the foregoing, according to the preferred embodiments of the present invention, there is provided a rotor of a generator or motor that has magnets additionally formed on the lines of magnetic force, thereby increasing magnetic flux to enhance the generation efficiency of the generator or motor and has a plurality of shaft-cooling holes formed thereon, thereby cooling the rotor body.

Further, the rotor of this invention has a rotor shaft formed of an insulating material, thereby removing the danger of an electric shock caused by the rotor shaft.

Additionally, the rotor of this invention has an auxiliary coil provided around the rotor body, thereby allowing the output voltages of the generator to be finely adjusted, suppressing the over shoot, and compensating the lacking magnetic force of permanent magnets upon the connection to large load, which ensures that high quality of power can be supplied.

Moreover, the rotor of this invention has a plurality of permanent magnets coupled to the rotor body in such a manner as to be of a round shape having a gradually small arc length toward the inside of the rotor body, thereby smoothly and uniformly forming the lines of magnetic force with no bending, which ensures that the generation efficiency of the generator can be enhanced and the vibration and noise caused during the operation of the generator can be reduced.

Furthermore, the rotor of this invention has an insulation sleeve formed of a nonmagnetic material and disposed between a bearing and a fixing bracket that connect the rotor and the stator, thereby preventing the generation of the leaking and circulating magnetic flux of the rotor, which ensures that the generation efficiency of the generator can be enhanced, the early abrasion of the bearing can be prevented, and the generation of electrical danger can be previously prevented.

What is claimed is:

1. A rotor of a generator or motor comprising:
   a rotor body adapted to axially rotate together with a rotor shaft;
   at least one set of N-polar and S-polar permanent magnet groups arranged along the circumferential direction of the rotor body at predetermined intervals;
   a plurality of magnetic flux-increasing elements arranged on the lines of magnetic force formed by the N-polar and S-polar permanent magnet groups around one side of the rotor body, wherein the plurality of magnetic flux-increasing elements are disposed between neighboring the N-polar and S-polar permanent magnet groups; and
   a middle magnet disposed between each of the N-polar permanent magnet groups and each of the S-polar permanent magnet groups and having N and S poles arranged to form the lines of magnetic force in a radial direction of the rotor body,
   wherein each of the N-polar and S-polar permanent magnet groups comprises a plurality of magnets arranged along the circumferential direction of the rotor, and the magnets arranged in the middle portion in the groups have a magnetic force stronger than the magnets arranged at both sides thereof,
   wherein the rotor body comprises division grooves formed along the outer circumference thereof to the N-polar permanent magnet groups to be spatially separated apart from the S-polar permanent magnet groups, wherein the plurality of magnetic flux-increasing elements and the middle magnet are disposed in the division grooves radially aligned.

2. A rotor of a generator or motor according to claim 1, wherein the rotor body comprises a cooling hole formed on at least any one space between each of the N-polar permanent magnet groups and the middle magnet and between each of the S-polar permanent magnet groups and the middle magnet.

3. A rotor of a generator or motor according to claim 1, wherein the N-polar permanent magnet groups are arranged in such a manner as to dispose the N-poles at the outer side along the radial direction of the rotor body, and the S-polar permanent magnet groups are arranged in such a manner as to dispose the S-poles at the outer side along the radial direction of the rotor body.

4. A rotor of a generator or motor according to claim 1, wherein the rotor body comprises a shaft-coupling part formed of an insulating material and adapted to be coupled around the outer periphery of the rotor shaft, and the shaft-coupling part has a plurality of cooling holes formed thereon.

5. A rotor of a generator or motor according to claim 1, wherein the rotor shaft is made of stainless steel.

6. A rotor of a generator or motor according to claim 1, wherein the rotor body comprises a plurality of unit rotor bodies laminated on top of one another along the shaft direction of the rotor shaft, and each of the unit rotor bodies comprises a plurality of rotary plates laminated on top of one another along the shaft direction of the rotor shaft.

7. A rotor of a generator or motor according to claim 6, wherein the middle magnet of each of the unit rotor bodies is disposed along the circumferential direction of the rotor body in opposite direction to the middle magnet of adjacent unit rotor body thereto.

8. A rotor of a generator or motor according to claim 6, wherein the rotor body further comprises an assembling guide member formed thereon in such a manner as to pass through the plurality of unit rotor bodies.

* * * * *